April 5, 1927.
M. BORGLUM
VEHICLE SIGNAL
Filed Dec. 4, 1924
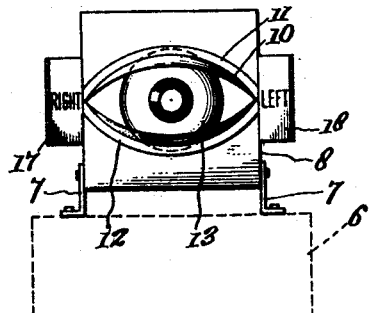
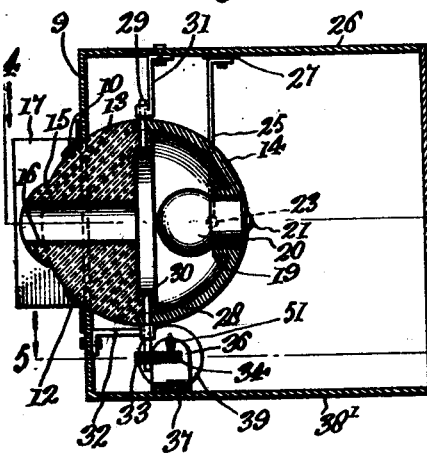
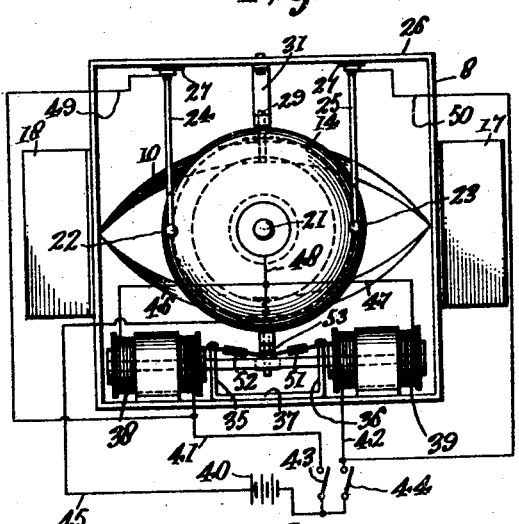
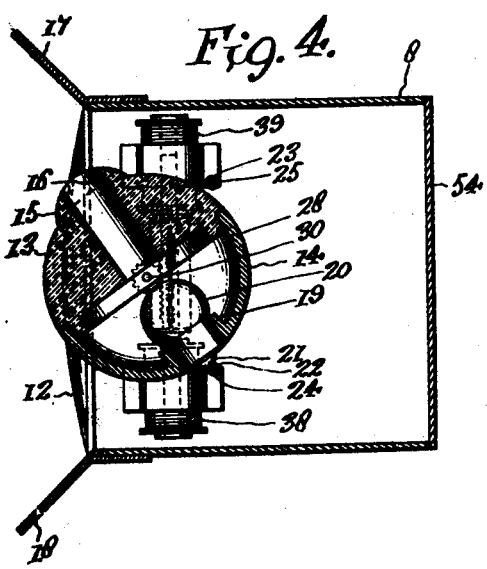
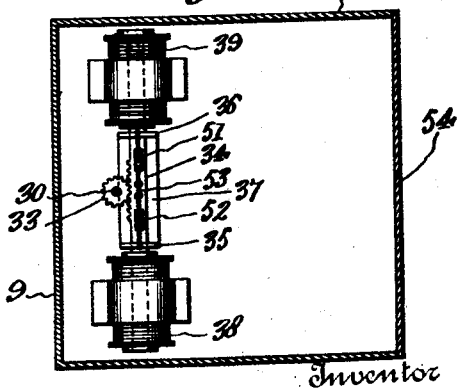
Inventor
Miller Borglum
by Wilkinson & Giusta
Attorneys Patented Apr. 5, 1927.

1,623,905

UNITED STATES PATENT OFFICE.

MILLER BORGLUM, OF BAKERSFIELD, CALIFORNIA.

VEHICLE SIGNAL.

Application filed December 4, 1924. Serial No. 753,957.

The present invention relates to improvements in vehicle signals, and more particularly refers to a signal devised for the purpose of showing to those in the rear, and also in the front if desired, proposed changes to the right or left of the vehicle carrying the signal.

An object of the invention is to provide a device intended to accomplish this purpose which will be light, small and compact in mechanical parts while providing a signal that will be attractive to the eye whereby to actively call attention to the same when displayed.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front view of the signal shown as attached to the fender of an automobile indicated in dotted lines.

Figure 2 is a vertical central section through the same taken on an enlarged scale.

Figure 3 is a rear view of the device with the back of the casing removed.

Figure 4 is a horizontal section taken centrally through the device, and

Figure 5 is a horizontal section taken on the line 5—5 in Figure 2.

Referring more particularly to the drawings 6 designates a vehicle fender to which the device may be attached as by the angle feet 7 which are riveted or otherwise affixed to the side portions of the casing 8 in which the various parts are mounted. The front wall 9 of the casing is provided with a substantially oval opening 10 to represent the socket of the human eye and above and below the socket opening are the strips 11 and 12, brazed, soldered, welded or otherwise secured to the casing and fashioned after the nature of the human eye lids.

Within the casing is mounted an eye ball for pivotal movement, the eye ball being mounted substantially centrally of the socket and composed of a substantially hemispherical translucent front member 13 and a metallic rear hemispherical member 14.

The latter member is preferably hollow and the front member 13 may be hollow or solid as shown. Centrally upon the front member is the raised pupil portion 15 and centrally through the pupil portion is an opening 16 for the purpose of transmitting light to the right and left signal panels 17 and 18 mounted at the side portions of the casing and projecting diagonally forward therefrom; the central parts of the panels which bear the words "Right" and "Left" are substantially in horizontal alinement with the axis of the opening 16 for a purpose later described.

The metallic hemispherical section 14 of the eye ball is provided with the rear central socket 19 for the electric lamp 20 which is a signal contact lamp having the central contact 21 projecting therefrom in accordance with the usual construction. This contact 21 is arranged to strike either of the contacts 22 or 23 carried upon the lower ends of the rods 24 and 25. The rods are suspended from the top 26 of the casing and, inasmuch as the casing will usually be of metal, insulation, indicated at 27, is placed between the contact supports and said casing.

The glass or translucent part of the eye ball is provided with a reduced shoulder 28 fitted removably within the metal part 14. The interfitted parts are perforated and receive the trunnions 29 and 30 upon which the eye ball rocks. The trunnions may be of metal and cemented therein. The upper trunnion is fitted in the bracket 31 while the lower trunnion is fitted in the bracket 32 which supports the eye ball, the metal portion thereof resting and rotating thereon. The lower trunnion 30 is extended downwardly to receive the pinion 33 made fast thereon and disposed in mesh with the teeth of the reciprocating rack bar 34. This bar is mounted in the spaced upstanding arms 35 and 36 of a yoke piece 37 mounted upon the bottom 38 of the casing at a central and forward point. The end portions of the rack bar extend through the solenoids or magnets 38 and 39 installed within the casing and adapted to be independently energized, for instance from the battery or source of current indicated at 40 in Figure 3.

The storage battery of the vehicle will serve this purpose. Independent circuits 41 and 42 extend from the battery to the magnets 38 and 39 and the independent switches 43 and 44 are used to selectively close these two circuits. The return wire or ground 45 is connected to both magnets by the branch wires 46 and 47. These branch wires are grounded upon the metallic portion 14 of the eye ball as indicated by the wire 48; while branch circuits 49 and 50 extend from the magnetic circuits to the contacts 22 and 23 through the contact supporting bars 24 and 25. A branch wire or conductor 49' is connected with the branch circuit 49 and conductor 41. A similar branch wire 50' connects the circuits 50 and conductor 42.

In the operation of the device, assuming the signal to be installed upon a vehicle and the switches 43 and 44 arranged convenient to the driver's hand, by closing either of these switches the intention to turn either to the right or the left at a street intersection may be announced by the shifting of the eye ball to the right or left and the illumination of the eye ball itself and of the signal panel toward which it has moved. For instance, if the driver of the vehicle intends to turn to the right, the switch 43 is closed thus energizing the electro-magnet 38 and causing the rack bar 34 to be drawn in thereby. Through the mechanical arrangement of the armature rack bar and pinion 33, the lower trunnion and consequently the eye ball will be shifted to the position shown in Figure 4 where the opening 16 through the pupil of the eye ball will point toward the right panel 17. When the eye ball arrives substantially at the final position of its movement, the contact 21 of the lamp will strike the suspended contact 23 and complete the circuit illuminating the lamp. The eye ball will suddenly become illuminated and the light will pass through the opening 16 to the panel 17 illuminating the panel fully at the instant the light is turned on. The position of the eye to one side and the illumination of the panel will indicate the direction of the proposed turn of the vehicle. The pupil of the eye ball will preferably be colored to simulate forcibly the appearance of the human eye and the eye strips 11 and 12 will also be painted or otherwise treated so that they may acquire the appearance of their human counterpart.

When the switch is again opened the rack bar and eye ball will be turned to the central and neutral position by means of the springs 51 and 52 attached at their outer ends to the upstanding parts 35 and 36 of the yoke member and at their inner ends to the staple 53 secured to the intermediate part of the rack bar.

The rear wall 54 of the casing may be in the nature of a removable cover whereby access may be had to the interior parts.

It is obvious that various changes and modifications may be made in the details of construction and design of the above specifically described embodiment of this invention without departing from the spirit thereof, such changes and modifications being restricted only by the scope of the following claims:—

What is claimed is:—

1. A signal device comprising a casing having a socket therein simulating an eye ball socket, a panel inclined forwardly at each side of the casing, an eye-ball member movably mounted in the socket provided with an opening therethrough, a source of light for projecting light rays through said opening, and means for moving the eye-ball member to aline the opening therein with a panel and illuminate the latter.

2. A signal device comprising a casing having a substantially oval socket therein, eye brow members above and below said oval socket, an eye ball member movably mounted in said casing and having a pupil portion with an opening therethrough, illuminating means in the eye ball member in line with said opening, direction panels inclining forwardly from the opposite sides of said casing, and means for moving the eye ball member to aline said opening therein with a selected panel and illuminate the latter with rays of light from said illuminating means projected through said opening.

3. A signal device comprising a casing constructed to simulate an eye ball socket, a panel at each side of the casing, an eye-ball member pivoted in the casing and having an opening therethrough, an electric lamp carried by the eye-ball member at the inner end of said opening to project light rays through the opening, means for swinging said eye-ball member selectively toward said panels to illuminate the same, and circuit closing means carried by the casing for engagement with a contact of said lamp to energize the same upon the movement of said eye-ball member.

4. A signal device comprising a casing, a panel disposed at each side of the casing, a pivoted eye piece mounted in the casing and provided with an opening arranged centrally therethrough, an electric lamp carried by the eye piece in line with said opening and having a contact projecting beyond the eye piece, means for selectively turning the eye piece toward said panels to illuminate the same by light rays projecting through said opening, and stationary contacts mounted in the opposite sides of the casing for engagement with the contact of said lamp when said eye piece is swung into signaling position.

MILLER BORGLUM.